United States Patent [19]

De Paoli et al.

[11] Patent Number: 5,435,945
[45] Date of Patent: Jul. 25, 1995

[54] METHOD AND APPARATUS FOR GENERATING SULPHUR SEED PARTICLES FOR SULPHUR GRANULE PRODUCTION

[75] Inventors: Sergio A. De Paoli; Jamsheed P. Irani, both of Calgary; Lloyd W. Ogle, Carstairs; Jerome P. Gillis, Whitecourt; Shaun E. Molloy, Whitecourt; Charles R. Kulhawy, Whitecourt, all of Canada

[73] Assignee: Procor Sulphur Services, Inc., Canada

[21] Appl. No.: 891,218

[22] Filed: May 29, 1992

[51] Int. Cl.⁶ .................. B29B 9/08; B29C 67/02
[52] U.S. Cl. ........................... 264/7; 264/11; 264/12; 264/13; 264/14; 264/117; 425/6; 425/7; 425/222; 118/303
[58] Field of Search .......... 264/5, 7, 11, 12, 13, 264/14, 117, 37; 425/6, 7, 10, 222; 118/303

[56] References Cited

U.S. PATENT DOCUMENTS

| | | |
|---|---|---|
| 1,994,718 | 3/1935 | Lellep . |
| 2,926,079 | 2/1960 | Smith . |
| 3,580,545 | 5/1969 | O'Brien . |
| 3,830,943 | 8/1974 | Hix et al. . |
| 3,877,415 | 4/1975 | Blouin ........................ 118/303 |
| 3,887,130 | 6/1975 | Chalmers . |
| 4,043,717 | 8/1977 | Riano ............................ 425/7 |
| 4,108,932 | 8/1978 | Takewell et al. ............ 264/37 |
| 4,213,924 | 7/1980 | Shirley, Jr. ................... 264/7 |
| 4,234,318 | 11/1980 | Higgins et al. ............. 23/293 S |
| 4,272,234 | 6/1981 | Tse .............................. 425/222 |
| 4,293,324 | 10/1981 | Sacman ........................ 65/27 |
| 4,353,709 | 10/1982 | Nioh et al. ................. 23/313 FB |
| 4,353,852 | 10/1982 | Tse .............................. 264/37 |
| 4,424,176 | 1/1984 | Shirley, Jr. et al. ........... 264/7 |
| 4,507,335 | 3/1985 | Mathur ...................... 427/215 |
| 4,686,115 | 8/1987 | Majer ......................... 427/212 |
| 4,842,790 | 6/1989 | Nunnelly ................... 264/117 |
| 4,846,409 | 7/1989 | Kaspar et al. ............... 241/21 |
| 5,071,332 | 12/1991 | Garcia et al. ................. 425/6 |

*Primary Examiner*—Allan R. Kuhns
*Attorney, Agent, or Firm*—Dressler, Goldsmith, Shore & Milnamow, Ltd.

[57] ABSTRACT

A method and apparatus are provided for generating seed particles. In one technique, a spray of water droplets is discharged to intersect a spray of liquid sulphur droplets to effect contact between some of the sulphur droplets and water droplets. The cooling sulphur droplets form seed particles. In another technique, water is sprayed into dispersed sulphur granules moving through a processing region. Subsequently, as the water is evaporating from the granules, liquid sulphur is sprayed onto the granules. Some of the liquid sulphur droplets impinge upon the water film-coated granules and solidify to form new seed particles which become detached from the granules. In another technique, a stream of liquid sulphur is discharged under pressure into a receiving region. A plurality of jets of atomizing fluid are injected into the stream to form a spreading spray of liquid sulphur droplets which solidify into seed particles.

32 Claims, 5 Drawing Sheets

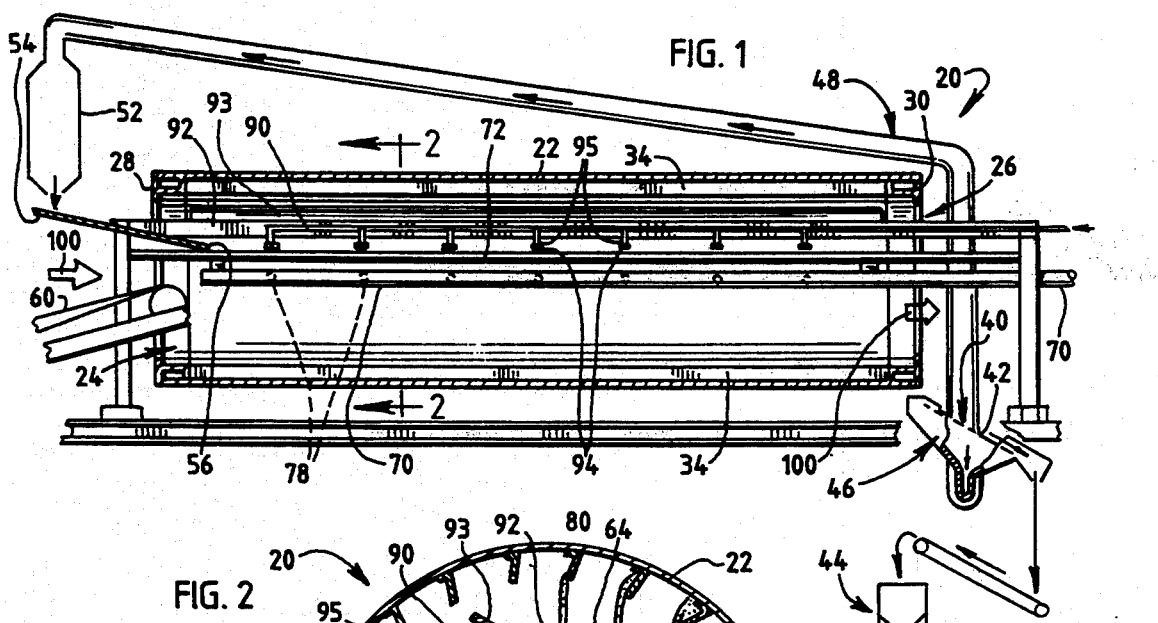
FIG. 1
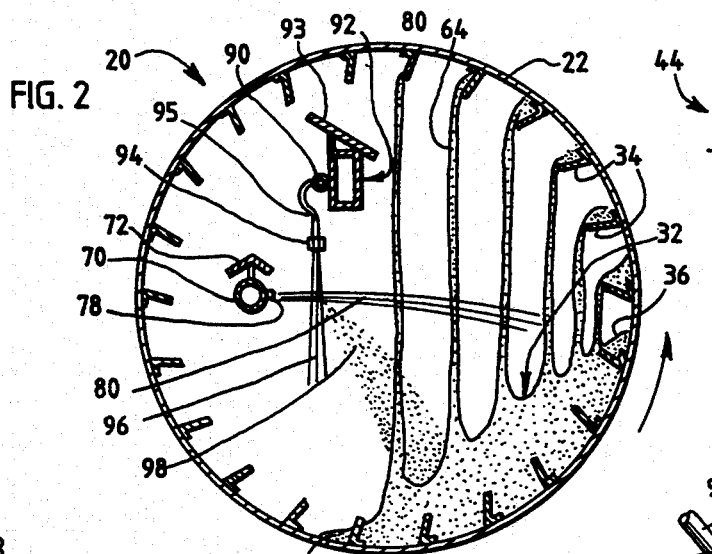
FIG. 2
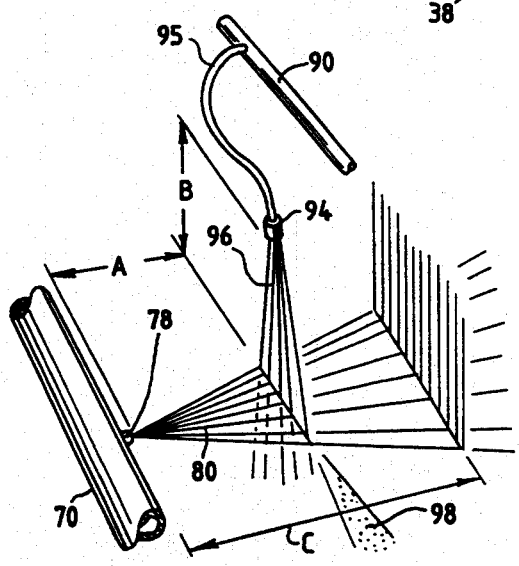
FIG. 3
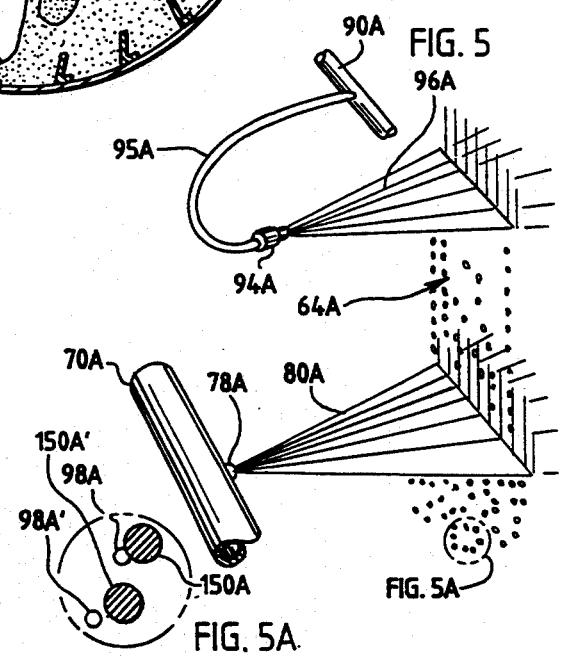
FIG. 5
FIG. 5A

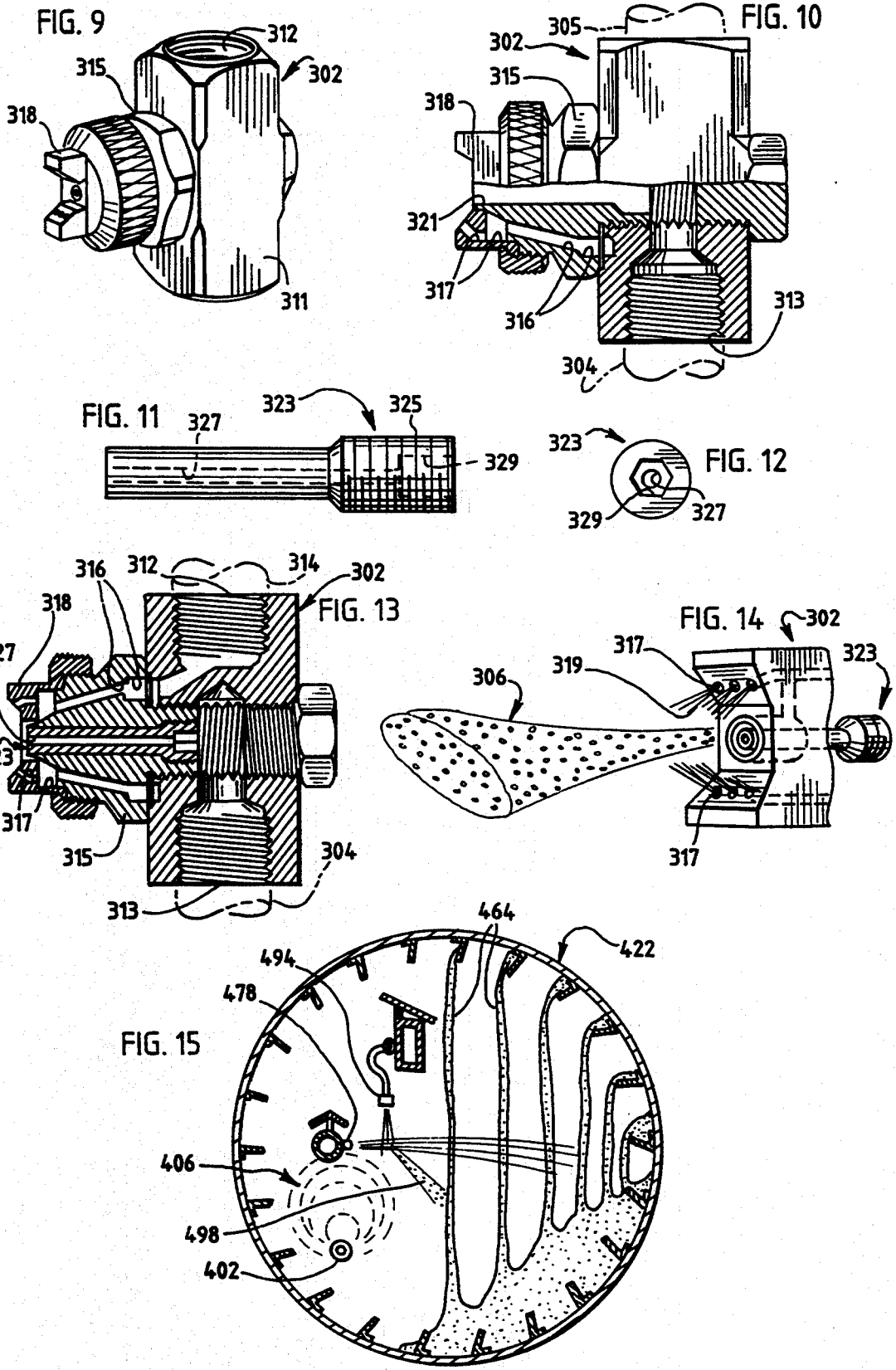

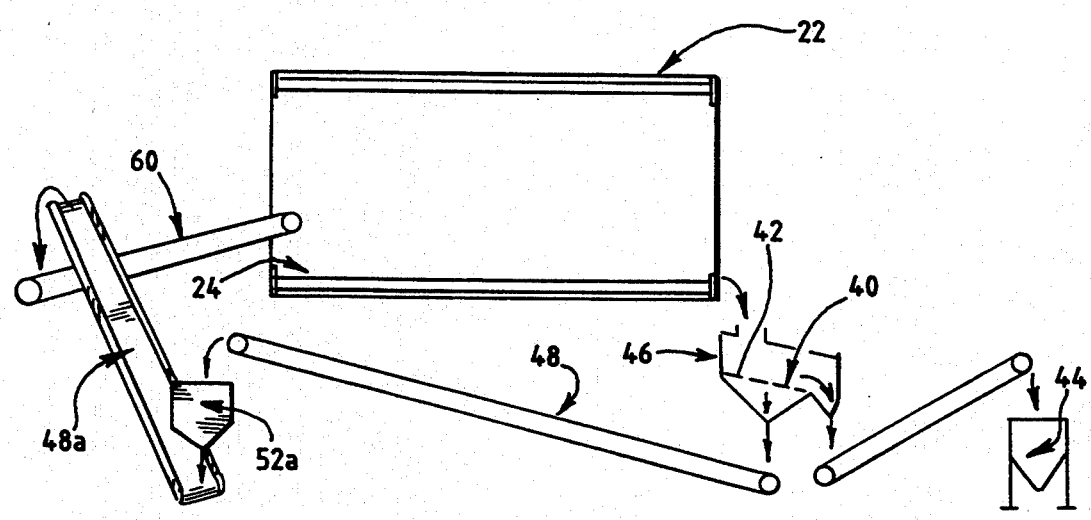

METHOD AND APPARATUS FOR GENERATING SULPHUR SEED PARTICLES FOR SULPHUR GRANULE PRODUCTION

TECHNICAL FIELD

The present invention relates to an improved method and apparatus for producing sulphur granules. More particularly, the present invention is directed to an improved process and apparatus for generating small, sulphur seed particles which can be used to produce the sulphur granules.

BACKGROUND OF THE INVENTION AND TECHNICAL PROBLEMS POSED BY THE PRIOR ART

Conventional processes are known for producing finished, full size, sulphur granules or pellets from smaller granules by spraying the smaller granules with liquid sulphur. In one such conventional process, the smaller granules are elevated from a bed in a rotating drum by lifting flights on the inside of the drum. The granules fall off of the moving flights and back into the bed.

The stream of granules which fall off the flights define "curtains" of granules associated with each flight. A sloped pan is located such as to intercept the fall of at least a few curtains. The intercepted granules slide off in the form of a dense curtain which is then sprayed with molten sulphur to coat the granules and thereby increase the granule size (e.g., the diameter of the generally spherical granules).

Heat is removed from the liquid sulphur causing solidification to occur, and the heat is transferred to water droplets causing evaporation. The resulting water vapor is removed in the form of a humid airstream. The finished product consists of granules of a desired increased size range, and these can be more conveniently and safely stored, transported, and/or used in a variety of processes by a variety of users.

Systems which produce sulphur granules of a desired size by coating smaller granules operate on a continuous basis, and the full size sulphur granules are continuously removed from the system. Thus, the full size sulphur granules that are continuously removed from the system must be replaced with smaller granules or seed particles in order to sustain continuous operation.

One such system is that sold under the designation "Procor GX Sulphur Granulating Unit" by Procor Sulphur Services, Inc., which has an office at 310 Southport Atrium, 10333 Southport Road S.W., Calgary, Alberta, Canada T2W 3X6. In that system, a charge of sulphur pieces, particles, or granules is initially loaded into a rotatable drum of the type described above. Initially and during normal operation seed particles are produced by an externally located crusher. As the drum operates, granules from the outlet end of the drum are discharged onto a double deck screen which sizes the granules into an oversize fraction (i.e., course particles generally larger than 4.75 mm. in diameter), a product fraction (i.e., particles with diameters between 2.36 mm. and 4.75 mm.) and an undersize fraction (i.e., particles generally smaller than 2.36 mm. in diameter). The oversize granules and pieces are directed to a crusher which generates the small seed particles required by the process. The seeds produced by the crusher are than co-mingled with the undersize fraction to form a combined stream which is then returned by an appropriate conveying system to the drum inlet.

While this process provides a satisfactory production rate, the use of a crusher tends to create dust which is prone to escape into the environment. Further, the production of seed particles by means of a crusher requires operation of the process in a manner that deliberately produces some quantity of oversize sulphur pieces that can be fed to the crusher. Finally, the crusher output material, while containing a significant amount of seed particles, also contains an amount of fine powder which is not desirable for use as seed particles and also usually contains some large pieces of sulphur which are not appropriate for use as seed particles.

Other techniques can be employed for introducing new seed particles into a sulphur granulation process. For example, U.S. Pat. Nos. 4,213,924 and 4,424,176 disclose various granulation processes in which seed particles are charged into a bed of sulphur granules in a rotary drum.

The U.S. Pat. No. 4,272,234, which is assigned to the assignee of the present invention, discloses a continuous process for producing small seed particles of sulphur which are subsequently coated with sprayed molten sulphur until they grow to the desired, finished granule size.

In a preferred form of the process, falling granules are sprayed with the molten sulphur in a rotating drum of the type described above, and the temperature is intermittently raised within the drum so that the sprayed sulphur does not completely solidify on the falling granules. The soft, plastic coating of sulphur is then abraded into small pieces which solidify into the seed nuclei or seed particles as the temperature is lowered.

U.S. Pat. No. 4,507,335, which is also assigned to the assignee of the present invention, discloses another method for generating seed particles. In that method, liquid sulphur is sprayed toward a curtain of falling, solid, sulphur particles. The pattern of the sulphur spray defines two areas—a first, central area defining a relatively high density region of liquid sulphur droplets and a second, peripheral area defining a relatively low density region, of liquid sulphur droplets in the form of a fine mist.

The central, relatively high density region of the liquid sulphur droplets extends into the curtain of falling solid sulphur particles so as to coat, and increase the size of, the falling sulphur particles. However, a significant portion of the fine liquid sulphur mist droplets in the peripheral region of the spray do not travel far enough in the liquid droplet state to reach the falling curtain of solid sulphur particles. Instead, the fine mist of liquid sulphur droplets in the low density, peripheral region of the spray are subjected to conditions which cause most of them to solidify into seed particles prior to reaching the falling curtain of solid sulphur particles, and these new seed particles drop onto the bed in the drum.

The solidification of the liquid sulphur droplets, including in the low density region of the spray, is effected by introducing a water spray into the drum in a region from which the particles are absent. The water evaporates into the air within the drum, and the heat of vaporization removes the heat of fusion of the liquid sulphur which is solidifying so as to keep the temperature below a selected maximum. Further, the water spray maintains a desired humidity level which cools the low density fine mist portion of the liquid sulphur spray and causes the seed particles to solidify in the low density, peripheral region of the spray.

While the above-described seed particle generation methods may be employed in a granulation process for producing larger size granules, it would be desirable to provide an improved method and apparatus for generating such seed particles on a continuous basis within an operating granulation system.

In particular, it would be advantageous to provide an improved system for generating sulphur seed particles which does not require the comminution of oversize granules, and it would be advantageous to provide such an improved system in which deliberate system temperature changes can be avoided so as to simplify the process control.

Finally, it would be desirable to provide an improved sulphur seed particle generation system which could relatively easily accommodate variations in, or changes to, the basic granulation process, which would be compatible with existing granulation process systems, including the rotating drum type, which would have an efficiency sufficiently high to accommodate a range of commercial production rates, and which facilitates the production of a high quality product.

The present invention provides an improved sulphur seed particle generation system which can accommodate designs having the above-discussed benefits and features.

SUMMARY OF THE INVENTION

One aspect of the present invention provides a novel method for continuously generating sulphur seed particles to be used in a process of spraying the seed particles with liquid sulphur to form sulphur granules larger than the seed particles. In particular, a spray of water droplets and a spray of liquid sulphur droplets are discharged to intersect and effect contact between some of the sulphur droplets and water droplets. This lowers the temperature of the sulphur droplets which then solidify into the sulphur seed particles.

According to another aspect of the invention, the above-described process is effected by an apparatus which includes means for discharging the spray of water droplets and means for discharging the spray of liquid sulphur droplets to intersect the spray of water droplets. In a preferred embodiment, the water droplets are sprayed from a nozzle in a generally downwardly directed orientation. The liquid sulphur droplets are sprayed from a nozzle in a generally horizontal direction to intersect the spray of water droplets and produce the new seed particles.

Preferably, the nozzles are positioned in a sulphur granulation drum so that the nozzles are adjacent a curtain of falling granules (and previously generated seed particles) and so that some of the liquid sulphur droplets also pass through the spray of water droplets into the curtain of falling granules and seed particles. The sulphur droplets coat the sulphur granules and sulphur seed particles in the curtain so as to increase the size of the granules and so as to form sulphur granules from the coated seed particles.

Another aspect of the invention relates to a technique for continuously generating sulphur seed particles without employing intersecting sprays of water droplets and liquid sulphur droplets. In particular, sulphur granules are first dispersed, as in a curtain, which moves through a processing region. At least some of the sulphur granules in the region receive water droplets delivered by a water nozzle so as to be partly or completely coated with a film of water. Evaporation of the water film is effected as the granules move through the region. A spray of liquid sulphur droplets is discharged into the region of water film-coated granules while the water film is evaporating from the granules. In some cases, the liquid sulphur droplets form a coating on some of the granules from which sufficient water has evaporated so that the sulphur solidifies and bonds to the granules to increase the size of the granules. In other cases, a liquid sulphur droplet solidifies on a granule which has retained a substantially thicker film of water so as to prevent the solidified sulphur droplet from bonding to the granule, and a new seed particle results when the solidified droplet detaches from the granule.

This technique can be effected with apparatus which includes means for dispersing the granules and moving the dispersed granules through a processing region. Means are also provided for coating at least some of the granules in the path with a film of water. In a preferred form of the apparatus, the granules may be lifted by flights in a rotating drum and dropped to form a curtain of falling, dispersed, granules while a nozzle sprays water into the curtain of falling granules.

A means is provided for effecting the removal of heat from the sulphur by removing the water vapor, arising from the evaporation of the water film on the granules or of fugitive water droplets, and this can include an exhaust fan system for moving air through the drum.

Means are also provided for discharging a spray of liquid sulphur droplets into the path of water film-coated granules, and this may include one or more nozzles located below the water nozzle.

Another technique for continuously generating sulphur seed particles within a rotating drum includes the steps of discharging a stream of liquid sulphur under pressure into a lower pressure receiving region within the drum which is substantially free of the granules to form a spreading spray of liquid sulphur droplets which solidify into the seed particles. Preferably, a plurality of jets of an atomizing fluid, such as steam, are injected into the stream of liquid sulphur to form the desired spray.

The above-described technique for providing a seed particle spray can be effected with apparatus that includes a means for discharging such a spray into an appropriate region of the drum. In a preferred embodiment, the apparatus includes an externally mixing type of atomizing spray device. The device has a central orifice for discharging a stream of liquid sulphur under pressure and has a plurality of atomizing fluid orifices which are laterally offset from the central orifice for injecting jets of an atomizing fluid into the liquid sulphur stream. Preferably, means are also provided for mounting the spray device to direct the spreading spray of the liquid sulphur droplets into a lower pressure receiving region in the drum which is substantially free of the granules.

Numerous other advantages and features of the present invention will become readily apparent from the following detailed description of the invention, from the claims, and from the accompanying drawings.

BRIEF DESCRIPTION OF THE DRAWINGS

In the accompanying drawings that form part of the specification, and in which like numerals are employed to designate like parts throughout the same, FIG. 1 is a simplified, partially schematic, partial cross-sectional side view of a sulphur granulation system employing a first embodiment of the present invention;

FIG. 2 is an enlarged, cross-sectional view taken generally along the plane 2—2 in FIG. 1;

FIG. 3 is an enlarged, simplified, perspective view in partially schematic form showing the operation of a water spray nozzle and sulphur spray nozzle as employed in the first embodiment of the present invention;

FIG. 5 is a view similar to FIG. 3 but showing a second embodiment of the present invention;

FIG. 5A is a greatly enlarged, diagrammatic view of a small region of FIG. 5;

FIG. 9 is a greatly enlarged, perspective view of an externally mixing type of atomizing spray device employed in the third embodiment of the system of the present invention;

FIG. 10 is a partial cross-sectional view of the device shown in FIG. 9;

FIG. 11 is a side view of an insert for the device illustrated in FIGS. 9 and 10;

FIG. 12 is an end view of the insert illustrated in FIG. 11;

FIG. 13 is a view similar to FIG. 10 and shows the insert of FIGS. 11 and 12 installed in the device illustrated in FIG. 10;

FIG. 14 is a simplified, partially schematic, perspective view of a distal end portion of the device illustrated in FIG. 13 shown in operation to produce an atomized spray of liquid sulphur droplets;

FIG. 15 is a cross-sectional view similar to FIG. 2 but showing a fourth embodiment of the invention in which the spray device illustrated in FIG. 14 is employed in the system illustrated in FIG. 2; and FIG. 16 is a view similar to FIG. 1, but more simplified and illustrating an alternative material handling system associated with the drum 22.

DESCRIPTION OF THE PREFERRED EMBODIMENTS

Figure 4:
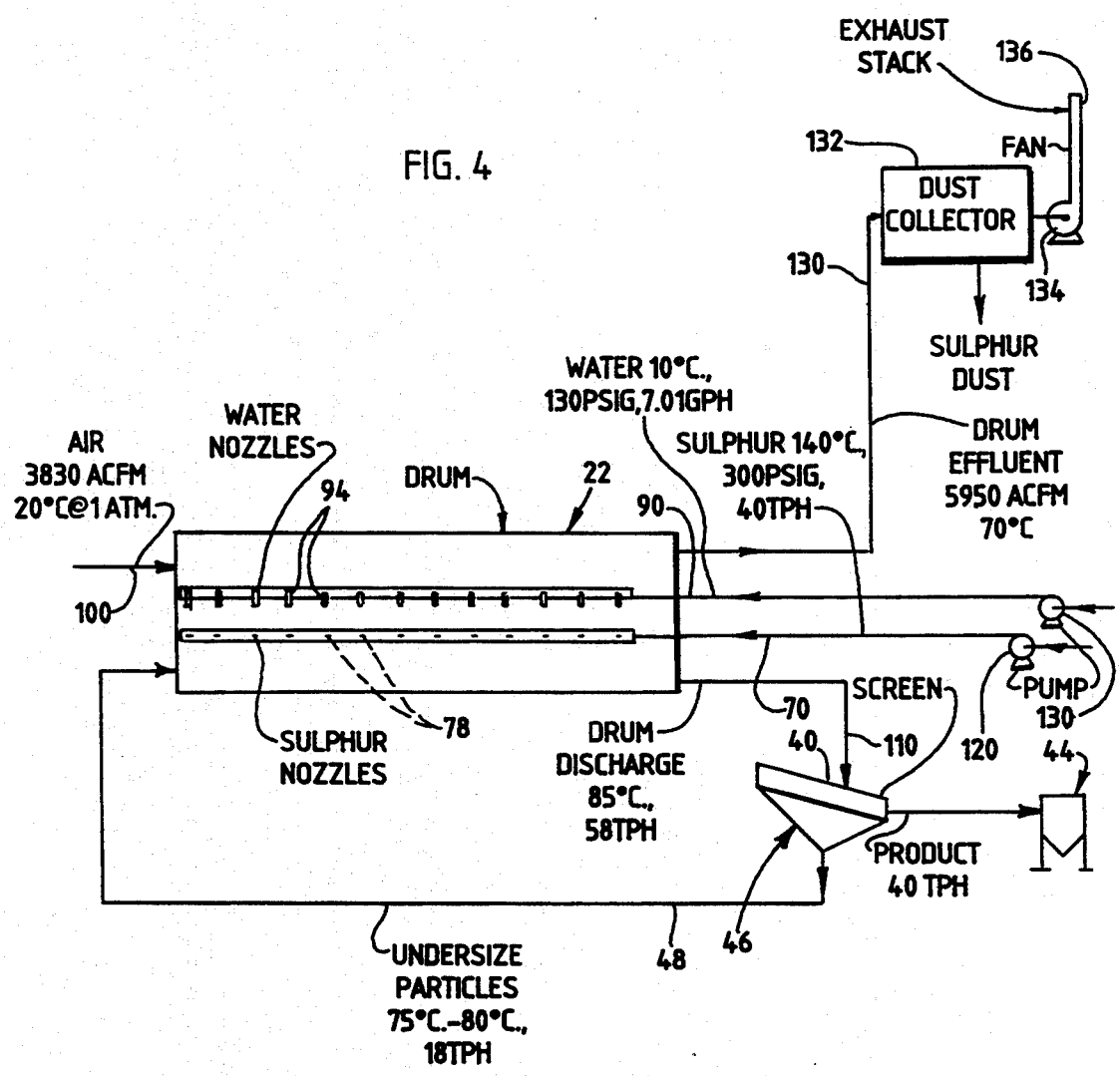
FIG. 4 is a simplified, schematic diagram illustrating an example of a process employing the first embodiment of the present invention.

While this invention is susceptible of embodiment in many different forms, this specification and the accompanying drawings disclose only some specific forms as examples of the invention. The invention is not intended to be limited to the embodiments so described, however. The scope of the invention is pointed out in the appended claims.

For ease of description, the apparatus of this invention is described in the normal (upright) operating position, and terms such as upper, lower, horizontal, etc., are used with reference to this position. It will be understood, however, that some forms of the apparatus of this invention may be manufactured, stored, transported, and sold in an orientation other than the position described.

Some of the figures illustrating embodiments of the apparatus show structural details and mechanical elements that will be recognized by one skilled in the art. However, the detailed descriptions of such elements are not necessary to an understanding of the invention, and accordingly, are not herein presented.

The apparatus of this invention is used with certain conventional components the details of which, although not fully illustrated or described, will be apparent to those having skill in the art and an understanding of the necessary functions of such components.

A first embodiment of the present invention is illustrated FIGS. 1–4 as employed in a sulphur granulation system which is generally designated by the reference numeral 20 in FIG. 1. The system 20 includes an open-ended, elongated, hollow, cylindrical drum 22 which is rotatable about a central axis.

Suitable support structures and rotating mechanisms (not illustrated) are provided for mounting the drum 22 so that it is inclined along its central axis (e.g., less than about 2°) with respect to a horizontal plane so as to slope from an entrance or feed end 24 to an exit or discharge end 26 (FIG. 1). The means for supporting the drum 22 and the means for rotating the drum may be of any suitable conventional or special design, the details of which form no part of the present invention.

The feed end 22 is partially closed by an annular ring 28, and the discharge end 26 is partially closed by a similar ring 30.

Sulphur granules and seed particles tumble inside the drum 22 in a bed 32 (FIG. 2) in the bottom of the drum 22 as the drum 22 is rotated about its central, longitudinal axis.

Inside the drum 22 there are a plurality of essentially identical, particle-lifting flights 34 which are equally spaced around the inside surface of the drum 22 and which project generally inwardly. Each flight 34 extends longitudinally substantially the entire length of the drum 22. As the flights 34 move through the bed 32 (during counterclockwise rotation of the drum 22 as viewed in FIG. 2), the flights 34 scoop solid sulphur granules and seed particles from the bed and raise the granules and seed particles to the upper portion of the drum 22. The flights 34 are generally flat so that each flight 34 will have dropped essentially all of its granules and particles that it is carrying by the time the flight 34 has moved a short distance past the highest point of the drum 22. This provides a shower of falling particles in the right-hand half of the drum as viewed in FIG. 2. A much smaller amount of granules and seed particles falls in the left-hand half of the drum near the vertical centerline of the drum.

As the drum 22 rotates, the bed 32 may be characterized as having an elongated, leading edge 36 which is elevated above an elongated, trailing edge 38. The sulphur seed particles and granules in the bed 32 gradually move from the drum feed end 24 to the lower discharge end 26 as the drum 22 rotates, and then the sulphur seed particles and granules fall over the discharge end ring 30 and out of the drum 22 into a collector assembly 46 which contains a sizing screen 40 having openings 42 of a predetermined size. A conventional two-deck screen may be employed with the top deck functioning to reduce the load to the bottom deck so that the bottom deck operates more efficiently.

Granules having a diameter larger than the holes 42 in the screen 40 are suitably directed to a product bin 44 for storage. Small sulphur granules and seed particles that fall through the screen holes 42 are directed via a conventional conveyor means 48, such as a belt conveyor, back to the feed end 24 of the drum 22. These undersized seed particles and granules vary in size from microscopic dust to almost product-sized granules which barely pass through the holes 42 in the discharge screen 40. The undersized particles are fed by the conveyor 48 to a hopper 52 which discharges onto a feed chute 54 having a terminal end 56 which extends into the drum feed end 24.

An alternate means of returning undersize particles to the inlet end 24 of the drum 22 is illustrated schematically in FIG. 16. It includes a belt conveyor 48 which may deliver the undersize material to either a seed hopper 52a discharging to a shuttle belt conveyor 48a, or directly to the shuttle belt conveyor 48a. The undersize material is carried from the conveyor 48a by an inlet conveyor 60 which delivers the undersize material into the drum 22.

The inlet conveyor 60 may be employed at the feed end 24 of the drum 22 in either the FIG. 1 process or the FIG. 16 process for also initially loading the drum with a charge of incompletely formed granules having a size less than the desired final product size.

Typically, the sulphur seed particles and granules in the bed 32 range in size from microscopic dust particles to full size, generally spherical granules. The final, completely formed, full size granule may be of any suitable larger size that is desired. For example, it may be desired to produce granules having a diameter of about 2.7 mm. Typically, 90% of the final granules produced would have a diameter between 1.7 mm. and 3.7 mm. For some applications, it may be desired to have a smaller or larger granule size. Typically, sulphur granules produced for commercial uses are generally spherical and have a diameter in the range from about 2 mm. to about 20 mm.

As the drum 22 rotates, the flights 34 impart a circumferential velocity to the seed particles and granules. Thus, as an individual seed particle or granule falls from a flight 34, that seed particle or granule drops downwardly and forwardly in an arc toward the bottom of the rotating drum 22. However, in a typical operating system, the dropping seed particle or granule appears to remain substantially vertically aligned with the circumferentially moving flight 34. Other seed particles and granules that subsequently fall from the same flight 34 also tend to remain substantially vertically aligned with the circumferentially moving flight. Thus, the seed particles and granules falling from a particular flight may be characterized as defining a shower or "curtain" 64 of falling seed particles and granules, and this curtain 64 moves with the flight toward the longitudinal center line of the drum 22. As the drum rotates, a plurality of such curtains 64 are created.

For a particular operating system, the curtains 64 of falling seed particles and granules appear as generally distinct, separated falling flows of material within a process region generally defined in one half of the drum as shown in FIG. 2. It will be appreciated, however, that in some systems the curtains 64 will not be as distinct and as separated. Indeed, in a system employing a drum having a great many flights, wherein each flight has a relatively short depth and wherein the drum is rotated at a relatively high speed, the seed particles and granules falling from the flights would tend to appear blurred together rather than in distinct curtains, so as to define a generally continuous shower of seed particles and granules throughout that half of the drum 22.

A conventional drum 22, along with the associated supporting and operating system components, that may be employed in conjunction with the present invention is sold under the designation "Procor GX Sulphur Granulating Unit" by Procor Sulphur Services, Inc. which has an office at 310 Southport Atrium, 10333 Southport Road S.W., Calgary, Alberta, Canada T2W 3X6.

The drum 22 may be of any suitable size, depending upon the process requirements and other factors. For example, a typical drum 22 may be about 7.75 feet in diameter and 28 feet long. Each flight 34 may have a depth in the range from about 5 inches to about 9 inches. Such a typical drum 22 may be rotated about its longitudinal axis at a speed in the range from about 12 revolutions per minute to about 6 revolutions per minute, depending upon the number of flights and on other factors.

A liquid sulphur header 70 is supported to extend through the drum 22 by suitable means (the details of which form no part of the present invention). A granule deflector shield 72 is provided on top of the liquid sulphur header 70 for deflecting the relatively small percentage of seed particles or granules that may be carried into that region of the drum and might otherwise tend to build up on the sulphur header 70.

The sulphur header 70 incorporates a surrounding steam jacket of well-known, conventional construction, the details of which are not illustrated and the details of which form no part of the present invention. The steam jacket maintains the sulphur within the header 70 in a liquid condition. The deflector shield 72 prevents solid seed particles and granules from being deleteriously affected by the high temperature of the header 70, and prevents any impinging particles and granules from melting on the header 70, then dripping off of the header, and resolidifying into undesirable build-ups on the flights 34 passing beneath the header 70.

A series of liquid sulphur spray nozzles 78 are spaced along the header 70 in fluid communication therewith. In a preferred form of the system illustrated in FIGS. 1–3, the sulphur nozzles 78 are aligned generally horizontally and are oriented to direct sprays of liquid sulphur droplets toward the falling curtains 64 of seed particles and granules.

Suitable sulphur spray nozzles 78 include those designated as type QVV, QU, QLU, and TP as sold by Spraying Systems Company which has an office at North Avenue at Schmale Road, Wheaton, Ill. U.S.A. Such nozzles direct the spray in a generally flat, fan-shaped configuration at a spray angle of between about 50 degrees and about 110 degrees. Other spray patterns (e.g., such as conical or square) may also be employed. The detailed design and structure of the nozzle per se forms no part of the present invention.

The liquid sulphur droplets are discharged from the nozzles 78 as sprays 80 (FIG. 2) which pass into the curtains 64 of the falling seed particles and granules. The droplets of liquid sulphur, in a preferred embodiment, have a temperature in the range of between about 125° C. and about 155° C. Some of these liquid sulphur droplets coat the solid sulphur seed particles and granules in the curtains 64. The coating solidifies on the seed particles and granules, and the size of the seed particles and granules increases.

The sulphur nozzles 78 may be oriented to discharge the liquid sulphur droplet sprays 80 somewhat downwardly or upwardly as well as forwardly or rearwardly (relative to the drum ends). Further, because the solid sulphur seed particles and granules in the bed 32 increase in average size as they migrate from the drum feed end 24 to the drum discharge end 26, the amount of liquid sulphur sprayed into the curtains 64 may be increased in the direction of particle migration. This can be accomplished, for example, by increasing the pressure at the nozzles 78 from the drum feed end 24 to the drum discharge end 26, or by using increasingly larger capacity nozzles toward the discharge end 26, so as to increase the effective discharge rate of the nozzles 78 from the feed end 24 to the discharge end 26.

In one contemplated embodiment which could be employed in a typical commercial application, the liquid sulphur is supplied to the nozzles 78 at a pressure in the range from about 1,033 kPa. gauge to about 2,065 kPa. gauge for discharging a flow rate in the range from about 500 kg./hour to about 3,500 kg./hour.

In order to keep the system operating continuously, the full size sulphur granules collected in the storage bin 44 must be continuously replaced by additional seed particles. To this end, a unique system is employed for effecting interaction of water with the sulphur sprays 80. In particular, a water supply header 90 extends along, and is supported by, a suitable beam, such as a box beam 92, that extends through the drum 22 from the inlet end 24 to the discharge end 26. A series of longitudinally spaced water spray nozzles 94 are in fluid communication with the water header 90 via individual lines 95. A granule deflector shield 93 is provided on top of the beam 92 and extends over the header 90 for deflecting seed particles or granules that may be carried into that region of the drum and build up on the header 90 and beam 92.

Each water nozzle 94 is oriented to direct water droplets in the form of a spray 96 into one of the liquid sulphur droplet sprays 80 as illustrated in FIGS. 2 and 3. Although the water spray 96 may be angled toward or away from the sulphur nozzles 78 and may be angled forwardly or rearwardly (relative to the drum ends), a presently preferred arrangement orients the sprays 96 in a substantially vertical, downwardly discharging configuration about a spray centerline generally parallel to the curtains 64 and substantially perpendicular to the centerline of the sulphur spray 80. In this contemplated, preferred embodiment, the water spray 96 has a generally flat, fan-shaped configuration. Other spray patterns (e.g., square or conical) could be employed.

In a presently contemplated application that could be employed in a sulphur granulation process of a typical commercial scale, the water spray angle could be in the range from about 50 degrees to about 110 degrees. The water could be supplied to each nozzle 94 at a pressure in the range from about 550 kPa. to about 6,890 kPa., at a temperature in the range from about 5° C. to about 50° C., and at a flow rate in the range from about 0.76 kg. per minute to about 2.3 kg. per minute.

Each nozzle 94 may be a suitable conventional, commercial nozzle, such as the nozzles designated QVV, QU, QLU, and TP as sold by the previously identified Spraying Systems Company.

The water spray 96 intersects with the sulphur spray 80 to effect contact between some of the sulphur droplets and some of the water droplets. This lowers the temperature of the sulphur droplets which then solidify into new sulphur seed particles 98 (FIG. 2). The seed particles 98 are discharged from the intersection region of the sprays 80 and 96 below the sulphur spray 80 at oblique angles so as to fall generally toward the bed 32. Some or all of the formed seed particles 98 may pass into and/or through a lower portion of the nearest curtain 64.

While there is no intent herein to be bound by any theory or any explanation, it is believed that the seed particles 98 result from the collision of sulphur droplets with water droplets which are typically smaller and colder than the sulphur droplets. The momentum of the collision deflects the sulphur droplet out of the main sulphur spray 80. As a result of the collision between a sulphur droplet and water droplet, a layer of water may coat part or all of the sulphur droplet, and this water layer absorbs some of the heat of the sulphur droplet. This is believed to effect a solidification of the droplet to form the seed particle.

Generally, only a small fraction of the water droplets and sulphur droplets collide or interact. Most of the sulphur spray 80 passes through the water spray 96 and into the curtains 64 of falling granules and seed particles. In a contemplated seed generation process as illustrated in FIG. 3, it is estimated that only about 5% of the sulphur droplets need to be cooled to form seed particles for a typical commercial production system.

Preferably, each water nozzle 94 is placed at a distance forwardly of an associated sulphur nozzle 78 and at a distance above the sulphur nozzle 78 so that all of the water spray 96 passes substantially through the zone of the liquid sulphur spray 80. In a presently contemplated, preferred embodiment, as illustrated in FIG. 3, the distance A between each sulphur nozzle 78 and the centerline of the water droplet spray 96 is between about 10 inches and about 12 inches. The distance B between the associated water nozzle 94 and the centerline of the sulphur spray 80 is between about 8 inches and about 10 inches. The distance C between the sulphur nozzle 78 and the closest or proximal curtain 64 is between about 14 inches and about 40 inches.

In general, the distance A is selected so that the water droplets from the spray 96 intersect the sulphur spray 80 in the region where the sulphur has dispersed into distinct droplets. The distance B is selected to provide a sufficient clearance with respect to the sulphur nozzles 78 so that peripheral sulphur droplets do not accumulate on the water nozzle 94.

The liquid sulphur droplets in the spray 80 which pass through the water spray 96 and which do not coat or interact with particles or granules in the nearest curtain 64 are eventually absorbed in more distant curtains 64. In general, a substantial amount of the sulphur spray 80 will typically pass through the nearest, proximal curtain 64 in which the falling seed particles and granules are relatively dispersed. The concentration of particles and granules in the curtains 64 generally increases with increasing distance from the sulphur nozzles 78.

A very small percentage of the liquid sulphur droplets in the spray 80 may pass through some or all of the curtains 64 without contacting a falling seed particle or granule, and this small percentage of the liquid sulphur droplets can form small dust particles. This dust, as well as dust that may be formed from abrasion of the sulphur granules and seed particles, can be carried away by a suitable exhaust system.

For example, an exhaust air flow may be effected through the drum 22 as indicated in FIG. 1 by the arrows 100. As shown in FIG. 4, this may be accomplished by employing a suitable conventional or special fan 134 operating downstream of a suitable conventional or special dust collector system 132 at the discharge end of the drum 22. Typically, a negative pressure of about ¼ inch water column would be drawn in the drum 22 to effect the appropriate exhaust flow into the dust collector and exhaust stack. Typically, air would enter the drum inlet end 24 at ambient temperature and pressure, and the exhaust effluent would be discharged at a higher temperature, for example 70° C., in a typical commercial process. Most of the water droplets from the spray 96 pass through the liquid sulphur spray 80 without contacting the liquid sulphur droplets in the spray 80. The water droplets passing through the liquid sulphur spray 80 function to cool the atmosphere in the drum by evaporation. The heat of vaporization removes sensible heat and the heat of fusion of the liquid sulphur which is solidifying (i.e., the solidification of a liquid sulphur droplet into a new seed particle, the solidification of a coating of liquid sulphur on a previously formed seed particle to form a larger granule, and the solidification of a layer of liquid sulphur on a granule to form an even larger granule). The moisture from the water nozzles 94, in conjunction with the air flow through the drum, can be adjusted to provide a desired humidification for maintaining the process exhaust effluent within a desired temperature range (typically between about 60° C. and about 85° C.) and for maintaining the temperature of the discharged sulphur granules within a desired temperature range (typically between about 65° C. and about 95° C.).

The sulphur nozzle system and water nozzle system is easily accommodated in the portion of the rotating drum that is substantially free of granules and seed particles falling from the flights. This area of the drum accommodates the placement of the sulphur nozzles 78 and water nozzles 94 at elevations that can be selected to minimize operating problems and maximize seed particle generation.

For example, the sulphur nozzles 78 can be located at an elevation within drum 22 that provides a relatively great vertical distance between the point where the falling granules are coated with the liquid sulphur spray 80 and the point where the granules impact upon the bed 32. A sufficiently great vertical distance allows the freshly sprayed granules to cool to a greater degree prior to impacting the bed 32, and this minimizes agglomeration of the granules. Agglomeration, which could otherwise result, occurs from the fusion of two or more granules that have surfaces containing liquid sulphur which has not yet solidified.

The relatively large, granule-free region of the drum 22 permits the location of the nozzles 78 to be selected from a relatively great number of possible locations relative to the falling curtains 64. The nozzles 78 can be located at a relatively great distance from the curtains 64, and this provides the design with more flexibility in the selection of sulphur nozzles that satisfy both the seed particle generation requirements and the granule coating (production) requirements.

The sulphur nozzles 78 and water nozzles 94 can be supported within the drum 22 by relatively simple structures having relatively small cross sections. This provides a relatively open region within the drum 22. Thus, the flow of air through the drum and the mixing of moisture throughout the drum is relatively unhindered. The cooling process within the drum can thus be effected more uniformly and efficiently. A substantially uniform cooling within the drum 22 is desired in order to provide final, full size granules which have a suitably low friability.

Further, because the support structures and other apparatus within the drum 22 are reduced to a minimum, there are fewer surfaces upon which sulphur dust can be deposited and form build-ups. Build-ups of sulphur dust are formed when the dust collects on surfaces within the drum, and these can become "cemented" into dust lumps by the moisture within the drum. Such dust lumps are detrimental to product quality and process operation.

FIG. 4 schematically illustrates an example of a granulation process employing the first embodiment of the present invention as illustrated in FIGS. 1–3. The design and operation of a granulation system can be extremely variable relative to the combination of technical design parameters that are selected. Generally, however, in commercial applications the equipment sizing and operating conditions are selected, to a great extent, on the basis of economic considerations, including efficiency considerations, as well as product quality.

The process flow parameter values designated in FIG. 4 have been selected to illustrate an example of a typical granulation system for a selected product output while employing the first embodiment of the present invention seed particle generation system. It will be appreciated that the parameter values designated in FIG. 4, as well as the range of parameter values and operating regimes discussed above with respect to the individual components illustrated in FIGS. 1–3, could vary depending upon initial assumptions, operating conditions, desired production rates, and other things.

In general, specific operating criteria and parameters can be selected by experimentation to meet various or changing operational parameters for a given system design. For example, in order to meet a change in production rate of the system, it may be necessary to increase or decrease the continuous seed particle generation requirements of the system. This might be achieved by changing one or a combination of a number of variables including, but not limited to, the following:

(1) the air flow rate through the drum 22;
(2) the air flow pattern inside the drum 22;
(3) the flow rate, temperature, and/or pressure of the liquid sulphur sprayed from the nozzles 78;
(4) the distance between the sulphur spray nozzles 78 and the water spray nozzles 94, as well as the relative orientations of the nozzles;
(5) the flow rate, temperature, and pressure of the water sprayed form the nozzles 94;
(6) the number and spacing of the nozzles 78 and 94;
(7) the distance between the sulphur nozzles 78 and the curtains of falling granules and seed particles;
(8) the type and size of liquid sulphur spray nozzles 78 and the water spray nozzles 94;
(9) the sulphur granule product size range; and
(10) the optional use of other seed generation techniques (described hereinafter) in conjunction with the above-described intersecting-spray technique of seed generation.

The system operation represented in FIG. 4 has been projected for a production rate of about 40 metric tons (40,000 kilograms) per hour producing a full size granule having a nominal diameter of about 2.7 mm. with 90% of the produced granules having a diameter between 1.7 mm. and 3.7 mm.

At a 40 metric ton per hour rate (designated "TPH" in FIG. 4), a ratio of undersized particles to full size granules is selected to be 0.45. Eighteen metric tons per hour of undersize particles are then produced and recirculated to the drum inlet end via the conveyor 48, and this could typically be effected at a temperature in the range from about 75° C. to about 80° C.

In order to provide 40 metric tons per hour of full size granule product and 18 metric tons per hour of undersize particles, the total drum discharge, designated by flow line 110 in FIG. 4, must be about 58 metric tons per hour. The granules are discharged at this rate at an average temperature of about 85° C.

The 40 metric tons per hour rate of granule production can be achieved in a rotating drum 22 having a diameter of about 7.75 feet and rotating at about six revolutions per minute. The liquid sulphur and water are supplied to the drum via headers 70 and 90, respectively, which each have an effective length within the drum 22 of about 24 feet. The sulphur header 70 is provided with 13 spray nozzles 78 spaced at equal 2 foot intervals center-to-center. The water nozzles 94 are similarly spaced on equal 2 foot center-to-center intervals along the water header 90.

Each sulphur spray nozzle 78 is of the above-identified type provided by the above-identified Spraying Systems Company and having a capacity size designation of 5040 for providing a flat, fan-shaped spray with a spray angle of about 62 degrees at 300 pounds per square inch gauge. Each water nozzle 94 is of the previously identified type sold by Spraying Systems Company and having a capacity size designation 6503 for producing a flat, fan-shaped spray with a spray angle of about 72 degrees at 130 pounds per square inch gauge.

The liquid sulphur is provided to the nozzles 78 via a suitable conventional or special pump 120 at 40 metric tons per hour at a pressure of about 300 pounds per square inch gauge. The liquid sulphur is maintained at about 140° C. by appropriate steam jacketing of the sulphur supply header 70.

The water is supplied to the nozzles 94 by a suitable conventional or special pump 130 at a flow rate of about 7.01 U.S.A. gallons per gallons per minute and a pressure of about 130 pounds per square inch gauge. The water temperature is about 10° C.

The nozzles 78 and 94 are positioned relative to each other and to the curtain 64 as illustrated in FIG. 3 with the A dimension being 12 inches, the B dimension being 10 inches, and the C dimension being 20 inches.

An exhaust conduit 130 connects the discharge end of the drum 22 to the dust collector 132 and exhaust fan 134 which discharges the clean effluent through an exhaust stack 136. The fan 134 is operated to draw a negative pressure of about 20 inch water gauge vacuum. The air flow into the drum 22, designated in FIG. 4 by the process flow line 100, is about 3830 actual cubic feet per minute (designated "ACFM" in FIG. 4) under atmospheric pressure and temperature (which temperature is shown in FIG. 4 as 20° C. for illustrative purposes). The drum effluent flow through the exhaust duct 130 is about 5950 actual cubic feet per minute at a temperature of about 70° C.

The sulphur pump 120, the water pump 130, the dust collector 132, and the exhaust fan 134 may be of any suitable conventional or special designs. The detailed design and operation of these components form no part of the present invention.

A modification of the seed particle generation process is illustrated as a second embodiment of the present invention in FIGS. 5 and 5A. A sulphur header 70A with nozzles 78A is mounted within a drum substantially identical to the drum 22 described above with reference to the first embodiment illustrated in FIGS. 1 and 2. As in the first embodiment, the sulphur nozzles 78A are oriented to discharge a liquid molten sulphur droplet spray 80A into curtains 64A of falling seed particles and granules.

A water header 90A is supported within the drum in substantially the same manner as the water header 90 in the first embodiment of the invention illustrated in FIGS. 1 and 2. A plurality of water spray nozzles 94A are mounted to the header 90A with individual supply lines 95A. However, unlike in the first embodiment, the lines 95A are curved to orient the nozzles 94A for discharging a water spray 96A toward the curtains 64A rather than downwardly parallel to the curtains 64A.

The water droplet spray 96A is shown as having a generally flat, fan-shaped configuration, and the liquid sulphur spray 80A is also shown as having a generally flat, fan-shaped configuration. In the illustrated embodiment, the sprays are substantially parallel. However, the sprays may be oriented at an oblique angle, and the sprays may have configurations other than a flat, fan-shaped configuration. In general, it is desired to spray the shower of falling sulphur particles and granules (i.e., the curtains 64A) with the water spray 96A as they fall through the processing region spaced above the liquid sulphur spray 80A.

It is believed that the falling particles and granules in the curtains 64A initially receive a coating or film of water from the spray 96A. As the particles and granules continue to fall toward the sulphur spray 80A, the water film begins evaporating from the granules and particles. While there is no intent herein to be bound by any theory or explanation, it is believed that some of the falling particles and granules may have received a relatively thin coating or film of water compared to other granules. Further, the water film may evaporate more quickly from some of the falling particles or granules than from other particles or granules.

In any case, it is believed that some of the liquid sulphur droplets from the sulphur spray 80A impinge upon the falling particles and granules. Because the liquid sulphur is substantially immiscible in water, the liquid sulphur droplets are prevented from bonding to a particle or granule which has a significant coating or film of water. The liquid sulphur droplets may thus be only loosely attached to the water film-coated sulphur granules or particles as those granules or particles continue to fall below the sulphur spray 80A. FIG. 5A illustrates a solid sulphur granule 150A to which is loosely attached a solidifying, or solidified, sulphur droplet 98A. The detached condition is illustrated in FIG. 5A for the granule 150A' and the separate seed particle 98A'.

The film of water on the granule 150A may have completely evaporated from the granule 150A by this time, or a portion of the surface of the granule 150A may still carry a thin, but rapidly evaporating, water film (not shown in FIG. 5A). In any event, it is believed that the solidified sulphur droplet 98A eventually becomes detached from the granule 150A. This may occur spontaneously as both the granule 150A and particle 98A fall to the bottom of the drum or this may occur when the particle 98A is abraded off of the surface of the granule 150A during mixing with other granules while tumbling in the bed at the bottom of the rotating drum.

Further, regardless of precisely when the particle 98A becomes detached from the granule 150A, it is important for the film of water on the granule 150A to eventually evaporate from the granule surface. Consequently, the temperatures of the liquid sulphur, water, and atmosphere within the drum are maintained as necessary to insure virtually complete evaporation of the water film from the granules under the particular process conditions (which include, among other things, the air flow rate, the distance between the water spray 96A and the sulphur spray 80A and the elevations of the sprays relative to the bed at the bottom of the drum).

In general, it is believed that the water film remains on the granules for a relatively short period of time before it evaporates, and therefore, the distance between the water spray 96A and the sulphur spray 80A should be relatively small. Further, it is believed that the probability of satisfying all of the conditions necessary for the production of a detached seed particle is relatively small. Thus, most of the liquid sulphur droplets, after impinging upon falling granules from which sufficient water has evaporated, bond to the granules and solidify on the granules so as to enlarge the granules. Hence, as the liquid sulphur spray 80A passes into the curtains 64A of falling particles and granules, the predominant process mode is one of enlarging the falling granules and particles with a new coating of sulphur, and only a small part of the sulphur spray is required for the production of new seed particles at the desired rate.

A third embodiment of the present invention for producing seed particles is illustrated in FIGS. 6-14. The seed particles are generated in a rotating drum system similar to that described above with reference to the first embodiment illustrated in FIGS. 1 and 2. A rotating drum 322 has a feed end 324 and a discharge end 326. The feed end 324 is partially closed by an annular ring 328, and the discharge end 326 is partially closed by an annular ring 330. The drum includes a plurality of particle-lifting flights 334 which lift seed particles and granules from a bed 332.

Adjacent the drum discharge exit 326 there is a collector assembly 346 containing a sizing screen 340 having openings 342 of a predetermined size. A conventional two-deck screen may be employed. Granules having a diameter larger than the holes 342 in the screen 340 are suitably directed to a product bin 344 for storage. Small sulphur granules and seed particles that fall through the screen holes 342 are directed via a conventional conveyor means 348, such as a belt conveyor, back to a hopper 352 at the feed end 324 of the drum 322 where the undersize particles are discharged back into the drum 322 through a feed chute 354.

To initially generate seed particles, a seed generating spray device 302, which is described in detail hereinafter, may be operated while other sulphur spray nozzles 378 (described in detail hereinafter) are not operated (i.e., plugged off).

A liquid sulphur header 370 extends into the drum and is supported from a structural support member 371 which includes an upwardly facing, angled deflecting plate or collector pan 373. The sulphur header 370 incorporates a surrounding steam jacket of well-known, conventional construction, the details of which are not illustrated and the details of which form no part of the present invention. A series of liquid sulphur spray nozzles 378 are spaced along the header 370 in fluid communication therewith. In the preferred form of this embodiment of the invention illustrated in FIGS. 6-14, the sulphur nozzles 378 are aligned generally horizontally and are oriented to direct a spray of liquid sulphur droplets toward curtains 364 of seed particles and granules which are formed as the seed particles and granules fall from the flights 334.

Figure 7:
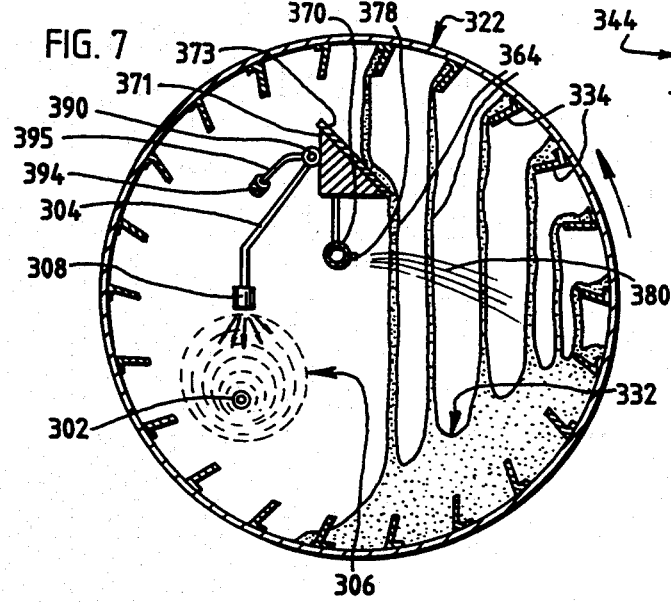
FIG. 7 is an enlarged, cross-sectional view taken generally along the plane 7—7 in FIG. 6.

The sulphur nozzles 378 may be identical to the nozzles 78 described above with reference to the first embodiment illustrated in FIGS. 1-3. The nozzles 378 function to discharge liquid sulphur droplet sprays 380 into and through the curtains 364 of falling seed particles and granules. In this embodiment, as can be seen in FIG. 7, the curtain 364 closest to the seed nozzles 378 is formed by particles and granules falling from each flight 334 at about the "12 o'clock" position, and those falling particles and granules impinge upon the angled plate 373 and then slide off of the bottom edge of the plate in front of the nozzles 378.

The liquid sulphur droplet spray 380 coats the falling particles and granules in the curtains 364, and the coatings solidify to thereby increasing the size (diameter) of the particles and granules.

Figure 6:
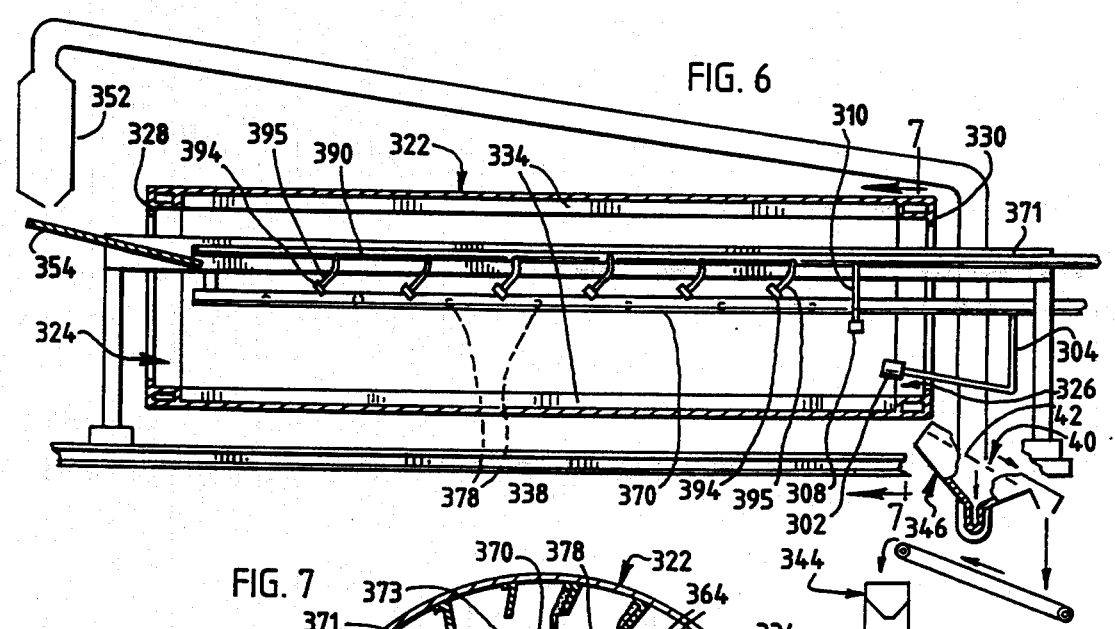
FIG. 6 is a view similar to FIG. 1 but showing a third embodiment of the present invention.

A water supply header 390 extends along, and is supported by, the support member 371. A series of longitudinally spaced water spray nozzles 394 are in fluid communication with the water supply header 390 via individual lines 395. As can be seen in FIG. 7, the water nozzles 394 are oriented to spray downwardly and outwardly into the half of the drum that is free of falling curtains of particles and granules. Further, as can be seen in FIG. 6, each nozzle 394 is angled toward the drum inlet end 324.

An air flow is maintained through the drum 322 via a suitable exhaust system which includes a dust collector, fan, and exhaust stack as described above for the first embodiment with reference to FIG. 4.

The water sprayed from the nozzles 394 provides humidification within the drum 322 for cooling the entire process and for maintaining the desired characteristics of the granules. Preferably, the water nozzles are oriented to direct the spray at about a 45 degree angle downwardly toward the bottom of the drum 322 and at a 45 degree angle toward the drum inlet end 326. Thus, the water spray is directed generally into the air flow that enters the drum 322 at the inlet end 324. This orientation directs the water droplets away from the support structure 371 and sulphur supply header 370.

The water droplets can be relatively large, and the above-described orientation of the water nozzles 394 minimizes the likelihood of the water droplets being transported by turbulent air currents to impinge upon the support structure 371 and/or sulphur supply header 370. This minimizes the moisture on or adjacent the internal components which might otherwise cement sulphur dust particles together to form dust lumps on the internal components.

The new seed particles are preferably produced by a unique process which employs an externally mixing type of atomizing spray device 302. The device 302 is supplied with liquid sulphur through a steam jacketed supply line 304. In the preferred form of the process, steam is supplied to the nozzle 302 through a line 305 connected to a steam supply system. The steam is externally mixed with the liquid sulphur by the device 302 to produce an atomized plume or spray 306 of small liquid sulphur droplets which cool and solidify to form new seed particles.

Figure 8:
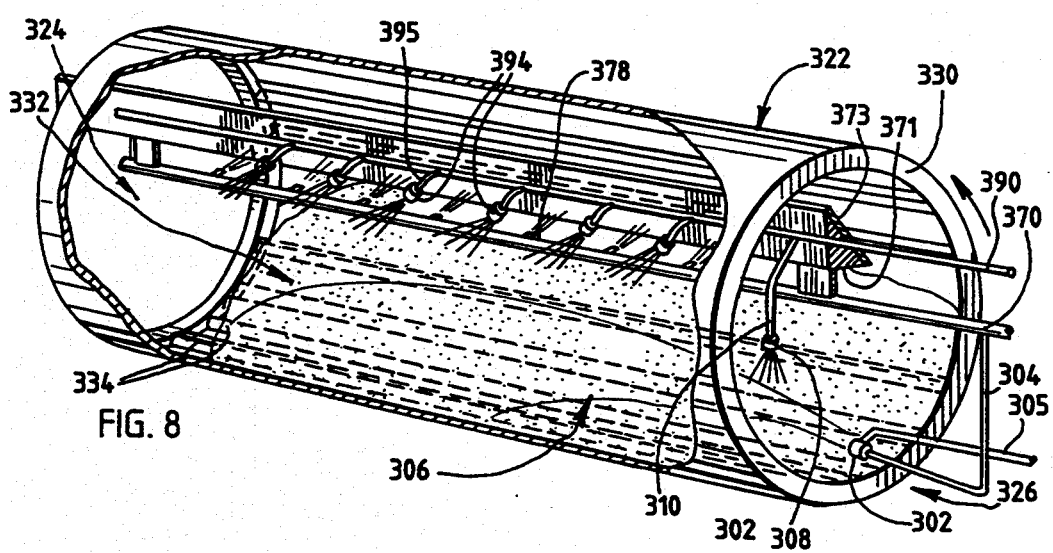
FIG. 8 is a simplified, fragmentary, perspective view of the third embodiment of the granulation system illustrated in FIGS. 6 and 7 with portions of the drum cut away to better illustrate interior detail.

The spray device 302 can be located at either end of the drum, but is shown at the drum discharge end 326 in FIGS. 6–8. The device 302 is preferably located relatively low at the end of the drum, typically about 1 foot above the drum flights 334. As best illustrated in FIG. 7, the device 302 is laterally displaced relative to the drum centerline (at about the 7 o'clock position as viewed in FIG. 7). The spray device 302 may be located just inwardly of the drum end as illustrated, or may be located outside of the drum (e.g., 2 or 3 feet beyond the drum discharge end 326). The longitudinal location of the spray device 302 relative to the drum 322 can be adjusted as necessary to increase or decrease the flight path length of the liquid sulphur droplets in the spray or plume 306.

In a preferred form of operation, the spray device 302 discharges the liquid sulphur droplets in a generally flat, fan-shaped spray or plume 306 that attains a width of about 2.5 feet to about 3.5 feet and a thickness of about 1 foot to about 2 feet. Further, the spray device 302 is preferably angled upwardly a small amount, as can be seen in FIG. 6, so that the plume or spray 306 arcs upwardly in the drum 322.

As the liquid sulphur droplets in the spray 306 travel through the drum 322, most of the droplets solidify into new seed particles before falling to the floor of the drum.

In order to accommodate the seed particle spray 306, the structural support 371, and the headers and nozzles supported thereon, are preferably located near the top of the drum as can be seen in FIG. 7. This minimizes the probability of encrustation of the components with liquid sulphur sprayed from the nozzle device 302.

A specially oriented water nozzle 308 is connected via a line 310 to the water supply header 390 upstream of the other water spray nozzles 394. The nozzle 308 per se may be identical to the above-described nozzles 394. However, the spray nozzle 308 is aimed so that it sprays into the plume of liquid sulphur droplets being discharged from the spray device 302. It is believed that this arrangement produces a greater quantity of new seed particles than would otherwise be produced and helps to deflect sulphur droplets away from the structural support 371 to prevent or minimize encrustation on the structure. While there is no intent herein to be bound by any theory or explanation, it is believed that the water spray from the nozzle 308 provides increased cooling of the liquid sulphur droplets in the plume 306, and that this promotes new seed particle generation.

In some applications, it may be desirable to provide more than one water spray nozzle 308 near the spray discharge from the device 302. For example, two or more nozzles, each similar to nozzle 308 illustrated in FIGS. 6–8, may be employed in a longitudinally spaced-apart configuration adjacent the end of the drum.

One commercially available spray device that may be employed for the device 302 is the "externally mixed" type of nozzle sold by the above-identified Spraying Systems Company, and such nozzles are sold under the designations E25, E45, and E75. As illustrated in FIGS. 9 and 10, such a nozzle device 302 includes a body 311 having an inlet 312 and an inlet 313. In the present invention, the inlet 312 is connected to the steam supply line 304 (FIG. 10), and the inlet 313 is connected to the liquid sulphur line 304 (FIG. 10).

As illustrated in FIG. 13, the device 302 includes a fluid cap 315 defining internal passageways 316 for communicating with the air inlet 312. The passageways 316 communicate with passageways 317 defined in an air cap 318 mounted to the distal end of the device 302. As illustrated in FIG. 14, a plurality of steam jets 319 are discharged from the passages 317 toward the centerline of the nozzle device 302 from laterally offset locations.

The device 302 includes a central passage 321 (FIG. 10) which is in communication with the liquid inlet 313. Liquid sulphur supplied to the inlet 313 will be discharged from the passage 321 and injected with the plurality of steam jets to form the spreading spray or plume 306 which consists of the liquid sulphur droplets. The characteristics of the spray 306 depend, of course, upon the configuration of the device 302 as well as upon the temperatures, pressures, and flow rates of the sulphur and steam provided to the device 302. In a typical process, where the liquid sulphur is provided at a temperature of about 140° C. under a pressure of about 300 pounds per square inch gauge, and where the steam is provided at a temperature of about 135° C. to 150° C. under a pressure of between about 30 pounds per square inch gauge and about 55 pounds per square inch gauge, it has been found that improved results are obtained if the above-identified Spraying System Company devices are modified in a unique manner.

In particular, it has been found that improved results are obtained if the effective diameter of the liquid passage 321 is reduced. To this end, a novel insert 323 has been developed, and the insert includes an enlarged base 325 which is threaded on its exterior. Mating threads are formed in the corresponding portion of the device passage 321 so that the insert 323 can be threadingly disposed therein as illustrated in FIG. 13. The insert 325 includes a central discharge passage 327 which is enlarged in the base 325 to define a hexagonal socket 329 for being engaged by an allen wrench during installation of the insert 323 in the device 302.

The diameter of the insert passage 327 depends upon the temperature, pressure, and flow rates of the sulphur, and to some extent, upon the temperature, pressure, and flow rates of the atomizing steam. In the presently contemplated applications, the diameter of the passage 327, beyond the hexagonal socket, can be 1.5 mm., 2.0 mm., or 2.5 mm. when the insert 323 is used under the above-discussed conditions with the above-identified Spraying Systems Company nozzle designated E75 as fabricated from stainless steel with ½ inch threaded inlets. The overall length of the insert is 35 mm., the depth of the hexagonal socket is 6 mm., and the length of the enlarged base 325 is 12.5 mm.

As the process is presently understood, the size of the insert 327 is best determined by trial and error with respect to best satisfying the seed particle generation requirements for a particular granulation system.

Although the spray pattern produced with the above-described modified device 302 has a generally flat, fan-shaped spray pattern, it will be appreciated that other spray patterns or configurations may be employed (e.g., rectangular or conical).

The spray device 302 could also be operated with an atomizing fluid other than steam, such as compressed air. However, it has been found that the use of steam is more effective than compressed air in producing the desired quantity of new seed particles under a range of operating process parameters contemplated for typical commercial systems.

It has been found that the seed particles produced by the nozzle device 302 have a diameter distribution ranging from about 1.0 mm. to about 0.15 mm. However, the diameters of the majority of the seed particles lie between about 0.6 mm. and about 0.3 mm.

The seed particle spray device 302 is preferably aimed in a manner that prevents or minimizes build-up of sulphur encrustation on the drum flights 334 or on the other internal components in the drum. Further, the spray device 302 should be aimed to avoid directing the spray or plume 306 toward or into the falling curtains 364 of granules. Preferably, the device 302 is aimed to direct the spray 306 slightly upwardly at about a 10 degree angle so as to discharge the liquid sulphur droplets in arching trajectories in order to increase flight path length and flight time, and so as to eliminate or minimize sulphur encrustation on the drum flights 334.

As presently understood, the precise aiming of the spray device 302 can best be determined by a trial and error process. The sulphur supply line 304 is preferably provided with the capability to accommodate movement of the spray device 302 both horizontally and vertically relative to the drum 322.

A strainer (not illustrated) which may be of any suitable conventional or special design, may be installed in the line 304 to avoid or minimize plugging of the insert 323 by solids that may be present in the liquid sulphur.

The spray device 302 can be employed with the other forms of seed particle generation described above with reference to FIGS. 1-5. For example, FIG. 15 illustrates a drum 422 having a seed generating spray device 402 that is substantially identical to the above-described seed generating spray device 302 described above with reference to FIGS. 6-14. The spray device 402 operates in conjunction with a new seed particle generation process employing intersecting sprays from sulphur spray nozzles 478 and water spray nozzles 494. The nozzles 478 and 494 are essentially identical to the nozzles 78 and 94, respectively, described above with reference to FIGS. 1-3. The intersecting sprays from the nozzles 478 and 494 produce new seed particles 498 which are deflected toward curtains 464 of falling granules 464. Beneath the nozzles 478 and 494, the spray device 402 discharges a plume or spray 406 of new seed particles along the length of the drum 422.

When the spray device 402 is combined with the sulphur spray nozzles 478 and water spray nozzles 494 as illustrated in FIG. 15, additional water spray nozzles can be eliminated. For example, the water spray nozzles 308 and 394 illustrated in FIGS. 6-8 can be eliminated because the functions of those water sprays can be fulfilled by the water spray nozzles 494.

The spray device 302 as shown in FIG. 13 could also be employed in a drum with the sulphur spray nozzles 78A and water spray nozzles 94A described above with reference to FIG. 5. The spray device 302 could be provided at about the same location in the drum as is shown for the spray device 402 in FIG. 15. However, because the water spray nozzles 94A (FIG. 5) are oriented to spray directly into the falling curtains 64A of granules, additional water spray nozzles, similar to the nozzles 394 and 308 illustrated in FIG. 8, could be employed along the drum over the plume discharged from spray device 302.

In summary, it is seen that a novel system has been discovered for providing seed particles or seed nuclei on a continuous basis for use in a continuously operating sulphur granule production process. The seed particle generation can be effected by employing a number of unique techniques, operating either separately or together in one system. The techniques of seed particle generation as taught by the present invention permit one of the major variables in the sulphur granulation process to be controlled and permits the elimination of an external crusher as a primary source of seed particles for supplying the sulphur granulation process.

The seed particle generation techniques can be effectively carried out with unique apparatus and are relatively easily controlled so as to provide a sufficient seed particle generation rate while at the same time minimizing adverse consequences, such as sulphur encrustation, external sulphur dust creation, etc.

The seed particles produced according to the teachings of the present invention can be efficiently provided in a desired range of preferred sizes. The quality of the seed particle shape and the quality of the seed particle surface is high or good, and this facilitates the production of high quality, spherical, full size product sulphur granules.

It will be readily apparent from the foregoing detailed description of the invention and from the illustrations thereof that numerous variations and modifications may be effected without departing from the true spirit and scope of the novel concepts or principles of this invention.

What is claimed is:

1. A method of continuously generating sulphur seed particles to be used in a process of spraying said seed particles with liquid sulphur to form sulphur granules larger than said seed particles, said method comprising:
    (A) discharging a spray of water droplets; and
    (B) discharging a spray of liquid sulphur droplets to intersect said spray of water droplets to effect contact between some of said sulphur droplets and water droplets for lowering the temperature of said sulphur droplets which solidify into said sulphur seed particles, said steps (A) and (B) including discharging said sprays from nozzles, locating a nozzle for discharging said spray of liquid sulphur droplets between about 10 inches and about 12 inches from the centerline of said spray of water droplets, and locating a nozzle for discharging said spray of water droplets between about 8 inches and about 10 inches from the centerline of said spray of liquid sulphur droplets.

2. A method of continuously generating sulphur seed particles to be used in a process of spraying said seed particles with liquid sulphur to form sulphur granules larger than said seed particles, said method comprising:
    (A) discharging a spray of water droplets; and
    (B) discharging a spray of liquid sulphur droplets to intersect said spray of water droplets to effect contact between some of said sulphur droplets and water droplets for lowering the temperature of said sulphur droplets which solidify into said sulphur seed particles, said step (A) including employing a first nozzle to discharge said spray of water droplets in a generally flat, fan-shaped spray having a spray arc encompassing an angle in the range from about 50 degrees to about 110 degrees, at a pressure in the range from about 550 kPa. gauge to about 6,890 kPa. gauge, and at a temperature in the range from about 5° C. to about 50° C.

3. The method in accordance with claim 3 in which a second nozzle is used to discharge said spray of liquid sulphur droplets in a generally flat, fan-shaped spray having a spray arc encompassing an angle in the range from about 50 degrees to about 110 degrees, at a pressure in the range from about 1,033 kPa. gauge to about 2,065 kPa. gauge and at a temperature in the range from about 125° C. to 155° C.

4. A method of continuously generating sulphur seed particles within a rotating drum in which said seed particles are sprayed with liquid sulphur to form sulphur granules larger than said seed particles, said method comprising:

(A) discharging a spray of water droplets in said drum;

(B) discharging a spray of liquid sulphur droplets in said drum to intersect said spray of water droplets to effect contact between some of said sulphur droplets and water droplets for lowering the temperature of said sulphur droplets which solidify into new sulphur seed particles;

(C) collecting said seed particles along with said granules in a bed within said rotating drum;

(D) continuously elevating said seed particles and granules from said bed; and (E) dropping said elevated seed particles and granules to form a shower of falling seed particles and granules with said shower being spaced from said spray of water droplets and passing through said spray of liquid sulphur droplets beyond the intersection of said sprays of liquid sulphur droplets and water droplets whereby said sulphur granules and sulphur seed particles in said shower are coated with said liquid sulphur to increase the size of said granules and to form new sulphur granules from said coated seed particles.

5. The method in accordance with claim 4 in which step (E) includes dropping said seed particles and granules to provide said shower of falling seed particles and granules in the form of a plurality of substantially separate, spaced-apart, generally parallel curtains of falling seed particles and granules; and said method includes the step (F) of exhausting evaporated water in an airstream.

6. The method in accordance with claim 5 in which said spray of liquid sulphur droplets is discharged toward said curtains from a location spaced between about 14 inches and about 40 inches from the closest one of said curtains.

7. A method of continuously generating sulphur seed particles to be used in a process of spraying said seed particles with liquid sulphur to form sulphur granules larger than said seed particles, said method comprising:

(A) dispersing said granules and moving said dispersed granules through a processing region;

(B) coating at least some of said granules in said region with a film of water;

(C) effecting evaporation of said water film as said granules move through said region; and (D) discharging a spray of liquid sulphur droplets into said region of water film-coated granules while said water film is evaporating from said granules whereby some of the liquid sulphur droplets form a coating on some of said granules from which sufficient water has evaporated so that the sulphur solidifies and bonds to said granules to increase the size of said granules and some of the liquid sulphur droplets solidify on said granules to form new seed particles which become detached from said granules.

8. The method in accordance with claim 7 in which step (A) includes dropping some of said granules to form a shower of dispersed granules falling through said region; and step (B) includes discharging a spray of water droplets into said shower of falling granules to coat at least some of said granules with a film of water.

9. The method in accordance with claim 8 in which step (B) also includes discharging said water at a temperature in the range from about 5° C. to about 50° C. at a pressure in the range from about 550 kPa. gauge to about 6,890 kPa. gauge;

step (C) includes the step of providing a flow of air through said region of dispersed granules at a temperature in the range from about 10° C. to about 70° C.; and step (D) includes discharging said spray of liquid sulphur droplets into said water film-coated granules below said water droplet spray at a temperature in the range from about 125° C. to about 155° C. and at a pressure in the range from about 1,033 kPa. gauge to about 2,065 kPa. gauge.

10. A method of continuously generating sulphur seed particles within a rotating drum in which said seed particles are sprayed with liquid sulphur to form sulphur granules larger than said seed particles, said method comprising:

(A) directing a flow of air through said drum;

(B) discharging a spray of water droplets in said drum;

(C) discharging a spray of liquid sulphur droplets in said drum at a location spaced below said spray of water droplets;

(D) collecting said seed particles along with said granules in a bed within said drum;

(E) continuously elevating said seed particles and granules from said bed; and (F) dropping said elevated seed particles and granules to form a shower of falling seed particles and granules which pass first through said spray of water droplets so that at least some of said granules become coated with a film of water and which pass subsequently through said spray of liquid sulphur droplets while said water film is evaporating from said granules into said air flow whereby some of the liquid sulphur droplets form a coating on some of said granules from which sufficient water has evaporated so that the sulphur solidifies and bonds to said granules to increase the size of said granules and whereby some of the liquid sulphur droplets solidify on said granules to form new seed particles which become detached from said granules.

11. A method of continuously generating sulphur seed particles in which said seed particles are sprayed with liquid sulphur to form sulphur granules larger than said seed particles, said method comprising the steps of:

discharging a stream of liquid sulphur under pressure into a lower pressure receiving region which is substantially free of said granules to form a spreading spray of liquid sulphur droplets which solidify into said seed particles, said spray of liquid sulphur droplets being directed in an arched configuration into a rotating drum and along the length of said drum; and discharging water droplets above said spray of liquid sulphur droplets to define a water spray extending in a direction generally away from, and at an oblique angle relative to, said spray of liquid sulphur droplets.

12. A method of continuously generating sulphur seed particles in which said seed particles are sprayed with liquid sulphur to form sulphur granules larger than said seed particles, said method comprising the steps of discharging a stream of liquid sulphur under pressure into a lower pressure receiving region which is substantially free of said granules to form a spreading spray of liquid sulphur droplets which solidify into said seed particles; and spraying liquid sulphur droplets into curtains of falling sulphur granules at a location spaced from said spray of liquid sulphur droplets which are solidifying into said seed particles.

13. A method of continuously generating sulphur seed particles within a rotating drum in which said seed particles are sprayed with liquid sulphur to form sulphur granules larger than said seed particles, said method comprising the steps of:

(A) discharging a stream of liquid sulphur under pressure in said drum into a lower pressure receiving region which is substantially free of said granules; and (B) injecting a plurality of jets of steam into said stream of liquid sulphur to form a spreading spray of liquid sulphur droplets which solidify into said seed particles.

14. The method in accordance with claim 13 in which said steam is injected at a temperature in the range from about 275° F. to about 305° F. at a pressure in the range from about 30 pounds per square inch gauge to about 55 pounds per square inch gauge.

15. A method of continuously generating sulphur seed particles within a rotating drum in which said seed particles are sprayed with liquid sulphur to form sulphur granules larger than said seed particles, said method comprising:

(A) discharging a stream of liquid sulphur under pressure from a central orifice of an externally mixing type of atomizing spray device while injecting a plurality of jets of an atomizing fluid into said liquid sulphur stream externally of said central orifice from a plurality of atomizing fluid orifices which are laterally offset from said central orifice to form a spreading spray of liquid sulphur droplets; and (B) directing said spreading spray of said liquid sulphur droplets in said drum into a lower pressure receiving region which is substantially free of said granules wherein said spreading spray of liquid sulphur droplets solidify into said seed particles.

16. The method in accordance with claim 15 in which said method further includes performing the following step during steps (A) and (B):

directing a flow of air through said drum in a direction generally parallel to the longitudinal axis of said drum.

17. The method in accordance with claim 15 in which step (B) includes directing said spray of liquid sulphur droplets in an arching configuration along the length of said drum.

18. The method in accordance with claim 15 further including the step of spraying water into said spray of liquid sulphur droplets.

19. The method in accordance with claim 15 in which step (A) includes discharging said sulphur at a pressure in the range from about 1,033 kPa. gauge to about 2,065 kPa. gauge.

20. Apparatus for continuously generating sulphur seed particles within a rotating drum having a circumferential array of internal lifting flights, wherein said seed particles are sprayed with liquid sulphur to form sulphur granules larger than said seed particles, and wherein said seed particles are (1) collected along with said granules in a bed within said rotating drum (2) elevated, and (3) dropped to form a shower of falling seed particles and granules, said apparatus comprising:

(A) means for discharging a spray of water droplets in said drum at a location spaced from said shower of falling seed particles and granules; and (B) means for discharging a spray of liquid sulphur droplets in said drum toward said spray of water droplets and toward said shower of falling seed particles and granules to (1) first intersect said spray of water droplets to effect contact between some of said sulphur droplets and water droplets which solidify into new sulphur seed particles and (2) subsequently pass beyond said spray of water droplets into said shower of falling seed particles and granules whereby said sulphur granules and sulphur seed particles in said shower are coated with said liquid sulphur to increase the size of said granules and to form new sulphur granules from said coated seed particles.

21. Apparatus continuously generating sulphur seed particles to be used in a process of spraying said seed particles with liquid sulphur to form sulphur granules larger than said seed particles, said apparatus comprising:

(A) means for dispersing said granules and moving said dispersed granules through a processing region;

(B) means for coating at least some of said granules in said region with a film of water;

(C) means for effecting evaporation of said water film as said granules move through said region; and (D) means for discharging a spray of liquid sulphur droplets into said region of water film-coated granules while said water film is evaporating from said granules whereby some of the liquid sulphur droplets form a coating on some of said granules from which sufficient water has evaporated so that the sulphur solidifies and bonds to said granules to increase the size of said granules and some of the liquid sulphur droplets solidify on said granules to form new seed particles which become detached from said granules.

22. Apparatus for continuously generating sulphur seed particles within a rotating drum having a circumferential array of internal lifting flights, wherein said seed particles are sprayed with liquid sulphur to form sulphur granules larger than said seed particles, and wherein said seed particles are (1) collected along with said granules in a bed within said rotating drum (2) elevated, and (3) dropped to form a shower of falling seed particles and granules, said apparatus comprising:

(A) means for directing a flow of air through said drum;

(B) means for discharging a spray of water droplets in said drum into said shower of falling seed particles and granules so that at least some of said granules become coated with a film of water; and (C) means for discharging a spray of liquid sulphur droplets in said drum into said shower of falling seed particles and granules at a location spaced below said spray of water droplets while said water film is evaporating into said air flow from said granules whereby some of the liquid sulphur droplets form a coating on some of said granules from which sufficient water has evaporated so that the sulphur solidifies and bonds to said granules to increase the size of said granules and whereby some of the liquid sulphur droplets solidify on said granules to form new seed particles which become detached from said granules.

23. Apparatus for continuously generating sulphur seed particles within a rotating drum in which said seed particles are sprayed with liquid sulphur to form sulphur granules larger than said seed particles, said apparatus comprising:

(A) means for discharging a stream of liquid sulphur under pressure in said drum to form a spreading spray of liquid sulphur droplets which solidify into said seed particles; and (B) means for directing said spray into a lower pressure receiving region which is substantially free of said granules.

24. The apparatus in accordance with claim 23 in which
said means for discharging a stream of liquid sulphur includes an externally mixing type of atomizing spray device having a central orifice for discharging a stream of liquid sulphur under pressure and having a plurality of atomizing fluid orifices which are laterally offset from said central orifice for injecting a plurality of jets of atomizing fluid into said liquid sulphur stream externally of said central orifice; and
said means for directing said spray into a lower pressure receiving region includes mounting means for mounting said spray device to direct said spray generally along a portion of the length of said rotating drum.

25. Apparatus for continuously generating sulphur seed particles within a rotating drum in which said seed particles are sprayed with liquid sulphur to form sulphur granules larger than said seed particles, said apparatus comprising:

(A) means for discharging a stream of liquid sulphur under pressure in said drum into a lower pressure receiving region which is substantially free of said granules; and (B) means for injecting a plurality of jets of an atomizing fluid into said stream of liquid sulphur to form a spreading spray of liquid sulphur droplets which solidify into said seed particles.

26. Apparatus for continuously generating sulphur seed particles within a rotating drum in which said seed particles are sprayed with liquid sulphur to form sulphur granules larger than said seed particles, said apparatus comprising:

(A) an externally mixing type of atomizing spray device having a central orifice for discharging a stream of liquid sulphur under pressure and having a plurality of atomizing fluid orifices which are laterally offset from said central orifice for injecting a plurality of jets of an atomizing fluid into said liquid sulphur stream externally of said central orifice to form a spreading spray of liquid sulphur droplets; and (B) mounting means for mounting said spray device to direct said spreading spray of said liquid sulphur droplets in said drum into a lower pressure receiving region which is substantially free of said granules wherein said spreading spray of liquid sulphur droplets solidify into said seed particles.

27. The apparatus in accordance with claim 26 further including means for spraying water into said spray of liquid sulphur droplets.

28. A method of continuously generating sulphur seed particles within a rotating drum in which said seed particles are sprayed with liquid sulphur to form sulphur granules larger than said seed particles, said method comprising:

(A) discharging a spray of water droplets in said drum;

(B) discharging a spray of liquid sulphur droplets in said drum to intersect said spray of water droplets to effect contact between some of said sulphur droplets and water droplets for lowering the temperature of said sulphur droplets which solidify into new sulphur seed particles;

(C) collecting said seed particles along with said granules in a bed within said rotating drum;

(D) continuously elevating said seed particles and granules from said bed;

(E) dropping said elevated seed particles and granules to form a shower of falling seed particles and granules with said shower being spaced from said spray of water droplets but passing through said spray of liquid sulphur droplets beyond the intersection of said sprays of liquid sulphur droplets and water droplets whereby said sulphur granules and sulphur seed particles in said shower are coated with said liquid sulphur to increase the size of said granules and to form new sulphur granules from said coated seed particles; and (F) discharging another spray of said liquid sulphur droplets in said drum into a lower pressure receiving region which is substantially free of said granules wherein said other spray of liquid sulphur droplets solidify into additional seed particles.

29. A method of continuously generating sulphur seed particles within a rotating drum in which said seed particles are sprayed with liquid sulphur to form sulphur granules larger than said seed particles, said method comprising:

(A) directing a flow of air through said drum;

(B) discharging a spray of water droplets in said drum;

(C) discharging a spray of liquid sulphur droplets in said drum at a location spaced below said spray of water droplets;

(D) collecting said seed particles along with said granules in a bed within said drum;

(E) continuously elevating said seed particles and granules from said bed;

(F) dropping said elevated seed particles and granules to form a shower of falling seed particles and granules which pass first through said spray of water droplets so that at least some of said granules become coated with a film of water and which pass subsequently through said spray of liquid sulphur droplets while said water film is evaporating from said granules into said air flow whereby some of the liquid sulphur droplets form a coating on some of said granules from which sufficient water has evaporated so that the sulphur solidifies and bonds to said granules to increase the size of the granules and whereby some of the liquid sulphur droplets solidify on said granules to form new seed particles which become detached form said granules; and (G) discharging another spray of liquid sulphur droplets in said drum into a lower pressure receiving region which is substantially free of said granules wherein said other spray of liquid sulphur droplets solidify into additional particles.

30. Apparatus for continuously generating sulphur seed particles within a rotating drum in which said seed particles are sprayed with liquid sulphur to form sulphur granules larger than said seed particles, said apparatus comprising:

(A) means for discharging a spray of water droplets in said drum;

(B) means for discharging a spray of liquid sulphur droplets in said drum to intersect said spray of water droplets to effect contact between some of said sulphur droplets and water droplets for lowering the temperature of said sulphur droplets which solidify into new sulphur seed particles;

(C) means for continuously elevating said seed particles and granules and for dropping said elevated seed particles and granules to form a shower of falling seed particles and granules with said shower being spaced from said spray of water droplets but passing through said spray of liquid sulphur droplets beyond the intersection of said sprays of liquid sulphur droplets and water droplets whereby said sulphur granules and sulphur seed particles in said shower are coated with said liquid sulphur to increase the size of said granules and to form new sulphur granules from said coated seed particles; and (D) means for discharging another spray of said liquid sulphur droplets in said drum into a receiving region which is substantially free of said granules wherein the liquid sulphur droplets from said other spray solidify into additional seed particles.

31. Apparatus for continuously generating sulphur seed particles within a rotating drum in which said seed particles are sprayed with liquid sulphur to form sulphur granules larger than said seed particles, said method comprising:

(A) means for directing a flow of air through said drum;

(B) means for discharging a spray of water droplets in said drum;

(C) means for discharging a spray of liquid sulphur droplets in said drum at a location spaced below said spray of water droplets;

(D) means for continuously elevating said seed particles and granules and for dropping said elevated seed particles and granules to form a shower of falling seed particles and granules which pass first through said spray of water droplets so that at least some of said granules become coated with a film of water and which pass subsequently through said spray of liquid sulphur droplets while said water film is evaporating from said granules into said air flow whereby some of the liquid sulphur droplets form a coating on some of said granules from which sufficient water has evaporated so that the sulphur solidifies and bonds to said granules to increase the size of the granules and whereby some of the liquid sulphur droplets solidify on said granules to form new seed particles which become detached form said granules; and (E) means for discharging another spray of liquid sulphur droplets in said drum into a receiving region which is substantially free of said granules wherein the liquid sulphur droplets from said other spray solidify into additional particles.

32. A method of continuously generating sulphur seed particles in which said seed particles are sprayed with liquid sulphur to form sulphur granules larger than said seed particles, said method comprising the step of discharging a stream of liquid sulphur under pressure into a lower pressure receiving region which is substantially free of said granules to form a spreading spray of liquid sulphur droplets which solidify into said seed particles, said step of discharging a stream of liquid sulphur including discharging said stream of liquid sulphur from a central orifice of an externally mixing type of atomizing spray device while injecting a plurality of jets of atomizing fluid into the liquid sulphur stream externally of the central orifice from a plurality of atomizing fluid orifices which are laterally offset from the central orifice.

* * * * *